UNITED STATES PATENT OFFICE.

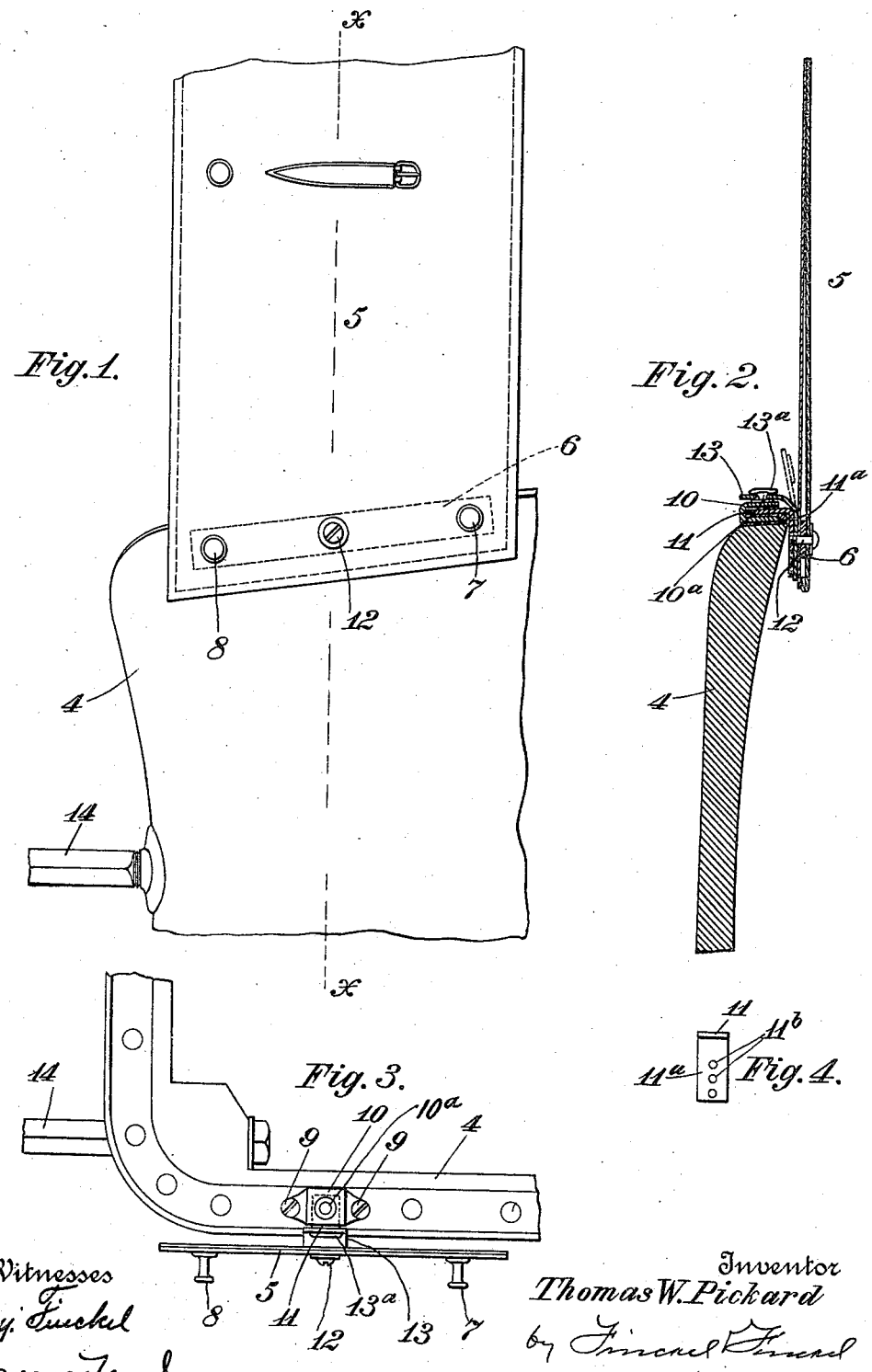

THOMAS W. PICKARD, OF COLUMBUS, OHIO.

VEHICLE-TOP-BACKSTAY FASTENER.

987,396. Specification of Letters Patent. Patented Mar. 21, 1911.

Application filed January 3, 1910. Serial No. 535,947.

*To all whom it may concern:*

Be it known that I, THOMAS W. PICKARD, a citizen of the United States, residing at Columbus, in the county of Franklin and State of Ohio, have invented a certain new and useful Improvement in Vehicle-Top-Backstay Fasteners, of which the following is a specification.

The object of this invention is to provide a simple, neat, effective and easily manipulated fastening device for the back stays of vehicle tops.

The invention is embodied in the particular example of it herein shown and described the invention not being confined in its embodiment to the precise forms or arrangement of them shown in such example.

In the accompanying drawing—Figure 1 is a view in rear elevation showing fractions of a vehicle seat and back stay with my fastening means applied thereto. Fig. 2 is a vertical sectional view on line $x$—$x$ Fig. 1. Fig. 3 is a top plan view of the socket piece on the rear upper edge of the vehicle seat. Fig. 4 is a detail view of the tongue member of the fastening device.

In the views 4 designates the vehicle seat and 5 the back stay of the top. In a top there are usually two of the back stays, the rear curtain and sides of the top being buttoned or otherwise secured when desired at their edges to the back stays.

A description and illustration of one back stay will suffice for both as they are substantially alike. Concealed in the lower edge of the back stay is a metallic bar 6 to the ends of which are secured knobs or buttons 7 and 8 for securing respectively the rear and side curtains of the top. On the rear upper edge of the seat is secured by means of screws 9 a metallic socket piece 10, and on the inner side of the back stay is secured an angular piece of metal forming a horizontally projecting tongue 11 and a shank $11^a$. The shank $11^a$ is secured in place by means of a screw 12 passed through the concealed metallic bar 6 referred to and into one of several threaded holes $11^b$ in the shank $11^a$ but between the shank and the material of the stay is first placed a flexible tab 13 preferably of leather carrying a metallic socket piece $13^a$ in its free end. The screw 12 thus secures in place on the stay both the tongue member 11 as well as the tab 13. The upper side of the socket member 10 is provided with a stud $10^a$. As the back stay becomes stretched by use the tongue member can be located higher up thereon by removing the screw 12 and turning it into a hole, in the shank $11^a$, nearer the tongue.

To secure the back stay to the seat the tongue 11 is inserted horizontally in the socket of the socket member 10 after which the tab containing the socket piece $13^a$ is sprung down on the stud $10^a$ where it is held by friction as shown in Fig. 2. The release of the device is effected by prying or pulling the metallic socket piece $13^a$ off the stud $10^a$ after which the tongue 11 can be withdrawn. A position of the tab after the insertion of the tongue and before the tab is fastened down on the stud $10^a$ is indicated by broken lines. It will be observed that the tongue 11 prevents upward or downward movement of the back stay and that the flexible tab 13 prevents withdrawal of the tongue from the socket member. It will also be observed that the device is easily manipulated from the interior of the vehicle either for fastening or releasing it.

The character 14 designates the top prop iron which does not constitute a part of the present invention.

What I claim is:

1. A vehicle-top back-stay fastening device comprising, in combination, a member having a horizontal socket, a stiff tongue on the back stay to engage said socket member to prevent vertical movement of the back stay and a flexible tab on the back stay having means to engage the socket member to prevent the removal of the tongue.

2. In combination with a vehicle seat and top back stay of a fastening device for the back stay comprising a socket member on one of said parts having a horizontally opening socket and a vertically standing stud, a tongue standing horizontally on the other of said parts to enter said socket piece, and a flexible tab having a socket piece to engage the vertically standing stud.

3. Means for securing a vehicle-top back-stay to the vehicle seat or body comprising, in combination, a member having a horizontal socket on one of said parts and a horizontally extending stiff tongue member on the other to engage said socket member, and a flexible member supplemental to said parts to secure the tongue member in engagement with said socket member, the member on the back stay being vertically adjustable.

THOMAS W. PICKARD.

Witnesses:
 BENJ. FINCKEL,
 MAYME FOARD.

Copies of this patent may be obtained for five cents each, by addressing the "Commissioner of Patents, Washington, D. C."